(12) United States Patent
Bulut et al.

(10) Patent No.: US 11,703,104 B2
(45) Date of Patent: Jul. 18, 2023

(54) CLUTCH DEVICE COMPRISING A FASTENING UNIT, WHICH HAS A CLAMPING ELEMENT BETWEEN A TORSIONAL VIBRATION DAMPER AND A DISCONNECT CLUTCH

(71) Applicant: Schaeffler Technologies AG & Co. KG, Herzogenaurach (DE)

(72) Inventors: Faruk Bulut, Lahr (DE); Marc Finkenzeller, Gengenbach (DE); Florian Vogel, Bühl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 46 days.

(21) Appl. No.: 17/422,301

(22) PCT Filed: Nov. 22, 2019

(86) PCT No.: PCT/DE2019/101003
§ 371 (c)(1),
(2) Date: Jul. 12, 2021

(87) PCT Pub. No.: WO2020/164650
PCT Pub. Date: Aug. 20, 2020

(65) Prior Publication Data
US 2022/0082138 A1    Mar. 17, 2022

(30) Foreign Application Priority Data

Feb. 13, 2019 (DE) .......................... 102019103547.3
Apr. 16, 2019 (DE) ...................... 10 2019 109 981.1

(51) Int. Cl.
*F16F 15/123* (2006.01)
*F16D 25/08* (2006.01)

(52) U.S. Cl.
CPC ........ *F16F 15/1238* (2013.01); *F16D 25/087* (2013.01)

(58) Field of Classification Search
CPC . F16F 15/1238; F16F 15/1207; F16D 25/087; F16D 2013/586; F16D 2013/588; F16D 13/644
See application file for complete search history.

(56) References Cited

U.S. PATENT DOCUMENTS

| | | | | |
|---|---|---|---|---|
| 2011/0259698 A1* | 10/2011 | Arnold | .................... | F16D 21/06 192/48.1 |
| 2013/0217510 A1* | 8/2013 | Vogel | ........................ | F16D 1/10 464/100 |
| 2017/0108054 A1* | 4/2017 | Baumann | ................ | F16D 13/72 |

FOREIGN PATENT DOCUMENTS

| | | |
|---|---|---|
| DE | 10155458 A1 | 5/2002 |
| DE | 102009059944 A1 | 7/2010 |

(Continued)

*Primary Examiner* — Richard W Ridley
*Assistant Examiner* — Aimee Tran Nguyen

(57) ABSTRACT

A clutch device for a drive train of a motor vehicle includes a torsional vibration damper with an output side, a disconnect clutch with a clutch component, and a fastening unit releasably connecting the disconnect clutch to the torsional vibration damper. The fastening unit includes a first toothing region fixed on the clutch component, a second toothing region fixed on the output side and positively rotationally connected with the first toothing region, and a clamping element. The clamping element is arranged to preload the first toothing region relative to the second toothing region in a circumferential direction with a preloading force, and preload the output side relative to the clutch component with an axial contact pressure.

18 Claims, 3 Drawing Sheets

(56) References Cited

FOREIGN PATENT DOCUMENTS

| | | | |
|---|---|---|---|
| DE | 102014212790 A1 | | 1/2015 |
| DE | 102017106318 A1 | * | 9/2018 |
| DE | 102017206227 A1 | | 10/2018 |
| JP | 2017509851 A | * | 4/2017 |

* cited by examiner

CLUTCH DEVICE COMPRISING A FASTENING UNIT, WHICH HAS A CLAMPING ELEMENT BETWEEN A TORSIONAL VIBRATION DAMPER AND A DISCONNECT CLUTCH

CROSS-REFERENCE TO RELATED APPLICATIONS

This application is the United States National Phase of PCT Appln. No. PCT/DE2019/101003 filed Nov. 22, 2019, which claims priority to German Application Nos. DE102019103547.3 filed Feb. 13, 2019 and DE102019109981.1 filed Apr. 16, 2019, the entire disclosures of which are incorporated by reference herein.

TECHNICAL FIELD

The disclosure relates to a clutch device having a torsional vibration damper and a disconnect clutch.

BACKGROUND

It is well known from the prior art to connect torsional vibration dampers on the output side for conjoint rotation with a clutch component of a disconnect clutch. Often a flywheel of the torsional vibration damper is screwed to the disconnect clutch. However, a disadvantage of known connection techniques, such as screwing, is that they make assembly of the clutch device or the drive train relatively cumbersome. These types of connection also often take up a relatively large amount of installation space. This in turn means that the components of the clutch device cannot be optimally nested with one another, so the entire installation space for the clutch device is relatively large.

SUMMARY

A clutch device is provided for a drive train of a motor vehicle, such as a car, truck, bus or other commercial vehicle. The clutch device has a torsional vibration damper, a disconnect clutch and a fastening unit which releasably connects the disconnect clutch to the torsional vibration damper. The fastening unit furthermore has a first toothing region fixed on a clutch component of the disconnect clutch, a second toothing region fixed on the output side of the torsional vibration damper and positively rotationally connected (indirectly or directly) with the first toothing region, as well as a clamping element preloading the toothing regions relative to one another with a preloading force in a circumferential direction. The clamping element is designed such that it preloads the output side of the torsional vibration damper with an axial contact pressure relative to the clutch component (the disconnect clutch).

The preloaded positive rotational connection between the output side of the torsional vibration damper and the clutch component of the disconnect clutch creates a fastening unit that can be implemented in a compact manner. For example, such a fastening unit requires relatively little axial installation space. In addition, installation of the clutch device is simplified. For this purpose, the two toothing regions only need to be pushed into one another and the clamping element released so that the toothing regions are braced relative to one another in the circumferential direction and are fixed relative to one another in the axial direction via a certain axial preloading force.

If the torsional vibration damper is designed as a dual-mass flywheel, with the output side being implemented directly by a driver disc that can be rotated relative to a primary wheel of the torsional vibration damper with damping of torsional vibrations, a space-saving connection of the torsional vibration damper to the fastening unit is made possible. The design of the torsional vibration damper as a dual-mass flywheel also results in effective torsional vibration damping of a drive train.

If the disconnect clutch has a first clutch component receiving the first toothing region and a second clutch component that can be coupled to the first clutch component, the clutch is connected as directly as possible to the fastening unit.

In this context, the second clutch component of the disconnect clutch may be connected for conjoint rotation with an intermediate shaft and the first clutch component of the disconnect clutch may be rotatably mounted on said intermediate shaft. In addition, the first clutch component may be supported in the axial direction (of the intermediate shaft) on said intermediate shaft. This results in a robust support of the disconnect clutch on the intermediate shaft.

Furthermore, the two clutch components of the disconnect clutch may be received on the intermediate shaft in such a way that an actuating force applied by an actuating unit, such as a clutch slave cylinder, for closing or opening the disconnect clutch, is supported via the intermediate shaft. The intermediate shaft therefore applies a counterforce to relieve the fastening unit as much as possible from the actuating forces that occur during operation. This broadens the usability of the clutch device.

The disconnect clutch may be designed as a single-disc or multiple-disc clutch (friction clutch). As a result, space-saving designs of the disconnect clutch can be implemented according to the torque to be transmitted. The disconnect clutch is particularly preferably realized as a multiple-disc clutch in the form of a friction plate clutch.

If a centrifugal-force pendulum device is fastened to a (first) clutch component of the disconnect clutch, the torsional vibration damping of the drive train is significantly increased during operation. The centrifugal-force pendulum device typically has a carrier that is fastened directly to the (first) clutch component of the disconnect clutch. Pendulum masses that can oscillate in the centrifugal force field are in turn received on the carrier.

The centrifugal-force pendulum device is attached to a radial outer side of a cup-shaped carrier of the first clutch component.

The centrifugal-force pendulum device may be arranged at least partially in an axial direction at the same height as a plurality of friction elements of the disconnect clutch that can be connected to one another. Thus, the centrifugal-force pendulum device may be arranged, on the one hand, in the radial direction outside the friction elements and, on the other hand, in the axial direction at the same height as the friction elements so as to achieve a compact axial nesting of the clutch device.

The centrifugal-force pendulum device may be arranged axially next to a plurality of damper springs of the torsional vibration damper and/or the fastening unit on its clamping element side may be arranged radially inside the centrifugal-force pendulum device and the damper springs. On its clamping element side, the fastening unit is in turn arranged axially offset with respect to the friction elements of the disconnect clutch.

In other words, a bracing device (fastening unit) is realized between a dual-mass flywheel (torsional vibration damper) and a K0 clutch (disconnect clutch). A hybrid drive train is proposed for a motor vehicle in which an internal combustion engine can be coupled to the drive train via what is termed the K0 clutch and can be decoupled from the drive train. A dual-mass flywheel is arranged between the internal combustion engine and the K0 clutch. The bracing device is arranged between the dual-mass flywheel and the K0 clutch and allows the dual-mass flywheel, which is screwed to the crankshaft of the internal combustion engine, and the K0 clutch, to be assembled without tools. A centrifugal-force pendulum may be arranged in the outer circumference of the K0 clutch and may be connected for conjoint rotation with the outer cage/counter-pressure plate/clutch housing of the K0 clutch.

BRIEF DESCRIPTION OF THE DRAWINGS

In the following, the disclosure is now explained in more detail with reference to figures.

In the drawings.

The figures are only schematic in nature and serve only for understanding the invention. The same elements are provided with the same reference signs.

DETAILED DESCRIPTION

Figure 1:
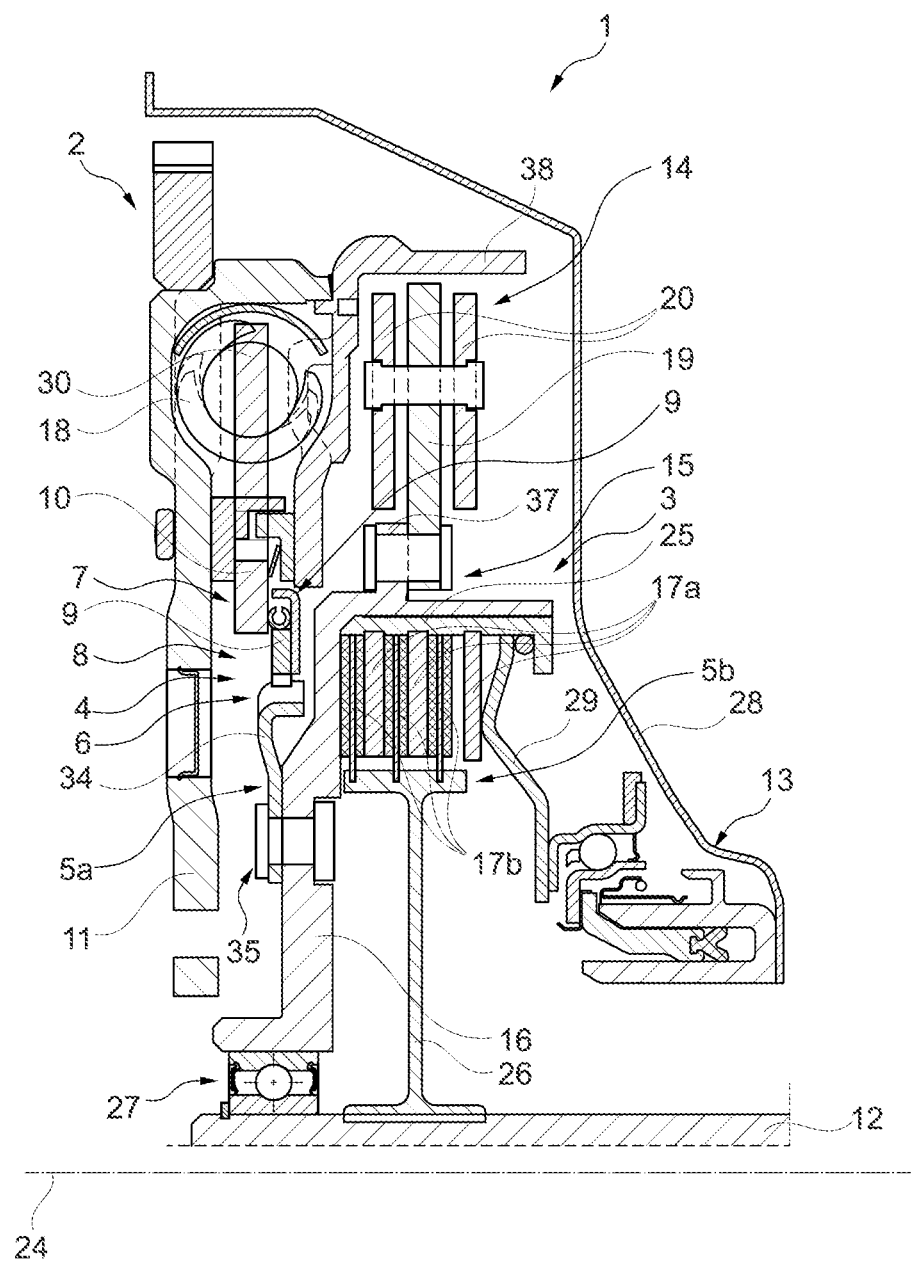
FIG. 1 shows a longitudinal sectional view of a clutch device according to an exemplary embodiment, in which a fastening unit coupling a torsional vibration damper to a disconnect clutch is shown in simplified form.
Figure 2:
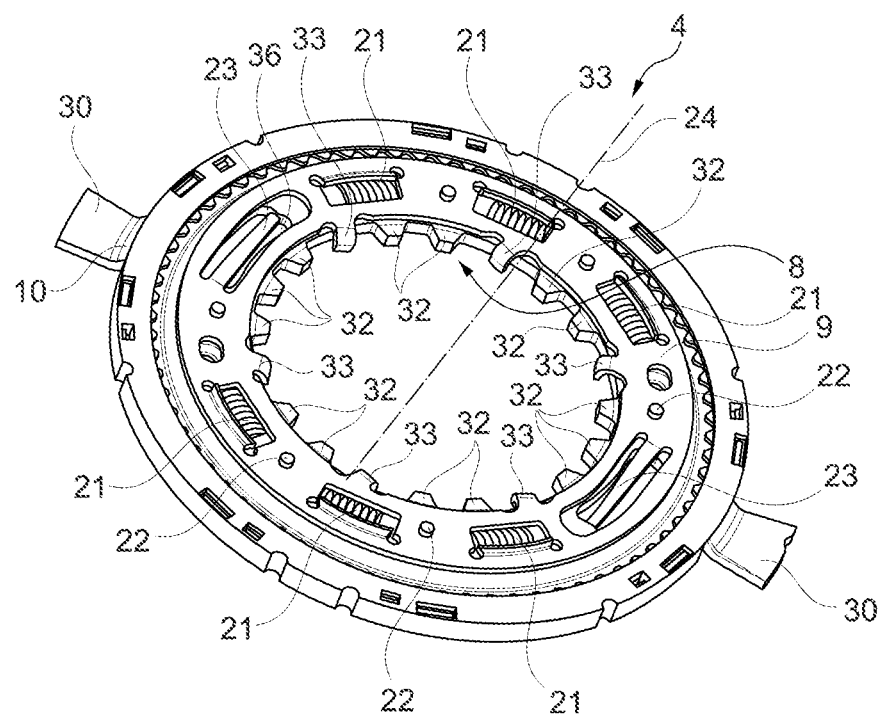
FIG. 2 shows a perspective detailed representation of the fastening unit used in FIG. 1 and already used on a driver disc of the torsional vibration damper.
Figure 3:
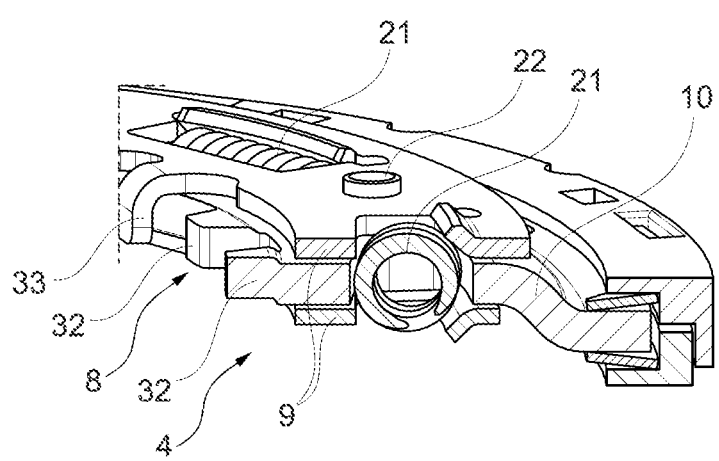
FIG. 3 shows a perspective sectional view of the fastening unit according to FIG. 2 in the region of a preloading spring which preloads the clamping element relative to the driver disc.

A structure of the clutch device 1 according to an exemplary embodiment can be clearly seen in connection with FIG. 1. The clutch device 1 is used in a typical manner to couple an output shaft of an internal combustion engine, not shown here for the sake of clarity, with further components of a drive train of a motor vehicle, for example a transmission and/or a rotor of an electrical machine.

On the input side, i.e., on the internal combustion engine side, a torsional vibration damper 2 is arranged in the clutch device 1. The torsional vibration damper 2 is realized as a dual-mass flywheel. The torsional vibration damper 2 therefore has an input-side primary wheel 11. The primary wheel 11 may be fastened to the output shaft of the internal combustion engine during operation. A driver disc 10, forming a secondary wheel, of the torsional vibration damper 2 is supported, according to an embodiment of a dual-mass flywheel, in a spring-damped manner relative to the primary wheel 11 via a plurality of damper springs 18 distributed in the circumferential direction.

Via the driver disc 10 forming an output side 7 of the torsional vibration damper 2, the torsional vibration damper 2 is connected to a disconnect clutch 3 by means of a fastening unit 4 designed according to the invention. The disconnect clutch 3 is realized as multiple-disc clutch in the form of a friction plate clutch. In further embodiments, however, the disconnect clutch 3 is also implemented otherwise, for example as a single-disc clutch. The disconnect clutch 3 has an (input-side) first clutch component 5a. The first clutch component 5a in turn has a carrier 16, which is realized here as an outer plate carrier; outer cage. The carrier 16 is mounted on a central intermediate shaft 12 which is rotatable about an axis of rotation 24. The carrier 16 has a sleeve-like receiving region 25, on the radial inner side of which a plurality of first friction elements 17a of the first clutch component 5a are received for conjoint rotation and so as to be displaceable relative to one another in the axial direction (along the axis of rotation 24). The carrier 16 of the first clutch component 5a is supported on an outer side of the intermediate shaft 12 via a support bearing 27 (here in the form of a roller bearing, specifically a ball bearing) such that the carrier 16 is supported in the axial direction on the intermediate shaft 12.

A second clutch component 5b of the disconnect clutch 3, which is connected for conjoint rotation with the first clutch component 5a in a closed position of the disconnect clutch 3, has a plurality of second friction elements 17b, which alternate with the first friction elements 17a in the axial direction. The second friction elements 17b are received for conjoint rotation on a connecting flange 26, forming an inner plate carrier, of the second clutch component 5b and so as to be displaceable relative to one another in the axial direction. The connecting flange 26 is further received directly for conjoint rotation on the intermediate shaft 12.

An actuating unit 13 is provided for actuating the disconnect clutch 3. The actuating unit 13 is implemented as a hydraulic actuating unit 13. The actuating unit 13 has a clutch slave cylinder. The actuating unit 13 is fastened to a housing 28 of the clutch device 1, which is shown only schematically in FIG. 1 for the sake of clarity. The actuating unit 13 has an adjusting effect in a typical manner on a lever element 29, which lever element 29 defines the axial position of the friction elements 17a, 17b with respect to one another and moves the disconnect clutch 3 between its open and closed clutch.

As can be seen in detail in FIGS. 2 to 6, the fastening unit 4 is designed to positively connect the driver disc 10 to the first clutch component 5a. The fastening unit 4 is shown in FIGS. 2 to 6 together with the driver disc 10. The corresponding damper springs 18 are supported in the circumferential direction in a typical manner on two stops 30 of the driver disc 10 which protrude outward in the radial direction.

Figure 4:
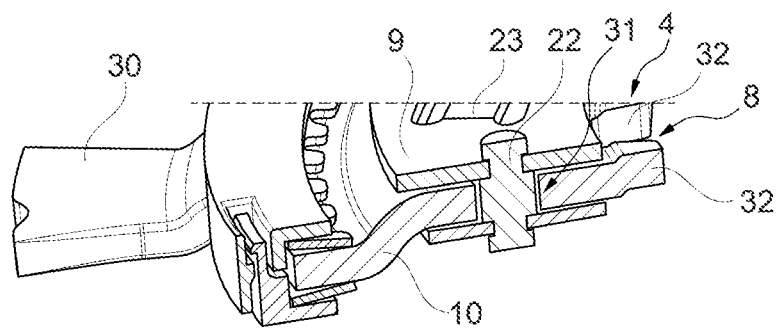
FIG. 4 shows a perspective sectional view of the fastening unit according to FIG. 2 in a region of a rivet connecting two regions of the clamping element.

As can be seen from FIGS. 2 to 6, viewed together, the fastening unit 4 has a clamping element 9 which is preloaded in a direction of rotation relative to the driver disc 10 via a plurality of preloading springs 21 arranged in the circumferential direction around the axis of rotation 24. As illustrated in FIG. 4, the clamping element 9 has two parts which are arranged on opposite axial sides of the driver disc 10 and are connected via a plurality of rivets 22 penetrating the driver disc 10 in the region of through-holes 31. A (second) toothing region 8 is formed on a radial inner side of the driver disc 10 and, in the assembled state of the clutch device 1 according to FIG. 1, is in a positive connection with a first toothing region 6 of the first clutch component 5a. The first toothing region 6 is implemented by a toothed metal sheet 34 and fastened to the carrier 16 (via a riveting). To this end, the toothed metal sheet 34 has a disc-like fastening region 35 which rests axially on an end face of the carrier 16 and is riveted to the carrier 16. From the fastening region 35, the toothed metal sheet 34 extends outward in the radial direction and merges towards its radial outer side into the axially extending first toothing region 6. In this embodiment, the first toothing region 6 is disposed in the radial direction with respect to the axis of rotation 24 at the same height as the friction elements 17a, 17b of the disconnect clutch 3.

The second toothing region 8 has a plurality of teeth 32 arranged to be distributed in the circumferential direction (FIG. 2), which teeth 32 alternate with bracing collars 33/bracing lugs in the circumferential direction on the clamping element 9. The bracing collar 33 is arranged in the axial direction at the same height as the teeth 32 and thus forms a preloaded tooth of the second toothing region 8 that is movable in the circumferential direction. The first toothing region 6 is implemented in a typical manner with a uniform toothing extending in the circumferential direction, such that, in contrast to the second toothing region 8, no gaps are produced that are replaced by the corresponding bracing collars 33.

Figure 5:
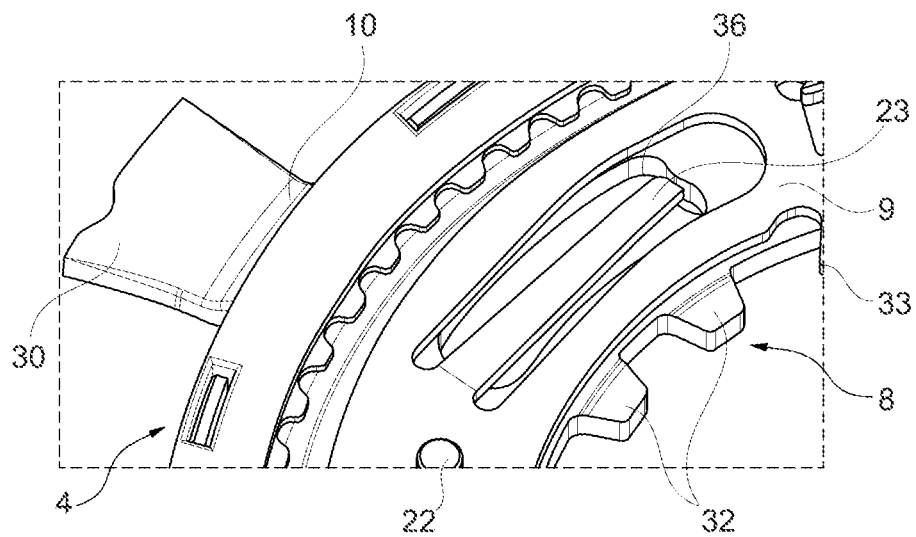
FIG. 5 shows a perspective detailed view of the fastening unit according to FIG. 2 in a region of a locking tongue for fixing the clamping element relative to the driver disc.
Figure 6:
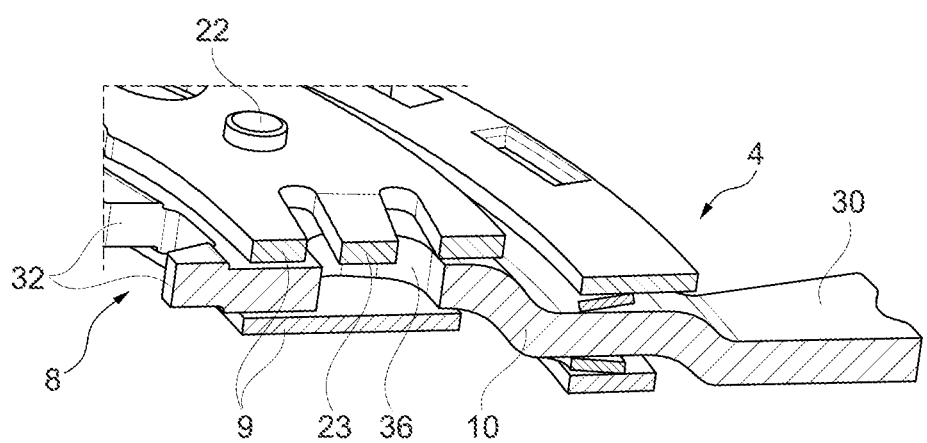
FIG. 6 shows a perspective sectional view of the fastening unit according to FIG. 2 in a region of the locking tongue according to FIG. 5.

Furthermore, it can be seen in FIGS. 5 and 6, for example, that the clamping element 9 has two locking tongues 23 which are arranged offset from one another by substantially 180° in the circumferential direction. Each locking tongue 23 extends in the circumferential direction and is pivotable in the axial direction. In the position according to FIGS. 5 and 6, the locking tongues 23 are in a preloaded state, with circumferential positive support in a recess 36 of the driver disc 10. The locking tongue 23 is fixed, in this assembly position of the clamping element 9 in the recess 36 to be implemented, in such a way that a rotation of the clamping element 9 relative to the driver disc 10 is blocked. The preloading springs 21 are arranged and designed in such a way that they press the locking tongue 23 in one direction of rotation into the recess 36 and thus into the assembly position.

When the clutch device 1 is assembled, the fastening unit 4 shown in FIGS. 2 to 6, is pushed with its second toothing region 8 onto the first toothing region 6 in the axial direction. The bracing collars 33 are arranged in relation to the teeth 32 in such a way that both the bracing collars 33 and the teeth 32 of the second toothing region 8 are flush with tooth gaps of the first toothing region 6 in the axial direction and the driver disc 10 can be pushed onto the carrier metal sheet. The locking tongues 23 are then released in that, for example, the clamping element 9 is rotated against the spring force of the preloading springs 21. The locking tongues 23 are released from the recesses 36 and the clamping element 9 is rotated in the circumferential direction relative to the driver disc 10 in the direction of rotation predetermined by the preloading springs 21.

The preloading force of the preloading springs 21 results in a circumferential pressing of the bracing collars 33 against the respective teeth of the first toothing region 6. This results in a positive toothing engagement formed between the two toothing regions 6 and 8 that is free of play in the circumferential direction. At the same time, owing to the design of the locking tongues 23, the clamping element 9 is displaced in the axial direction with a certain axial preloading force against the driver disc 10 in an axial direction of the axis of rotation 24. In the axial direction, the clamping element 9 comes to a stop on a region of the first toothing region 6. As a result, an axial contact pressure is also generated, which ensures that the driver disc 10 is fixed in the axial direction with respect to the first clutch component 5a.

Returning to FIG. 1, it should also be pointed out that a centrifugal-force pendulum device 14 is also provided. The centrifugal-force pendulum device 14 is implemented in a radial outer side 15 of the carrier 16. The carrier 16, which, on the one hand, forms the outer plate carrier and, on the other hand, forms a counter-pressure plate of the disconnect clutch 3 and a clutch housing, has anchoring regions 37 on its radial circumferential side in the form of radially protruding tabs on which a carrier element 19 of the centrifugal-force pendulum device 14 is fixed. This fixation is produced by a rivet connection. A plurality of pendulum masses 20 are received on the carrier element 19 in an oscillating manner in a centrifugal force field during operation of the clutch device 1.

The centrifugal-force pendulum device 14 is arranged with its carrier element 19 and its pendulum masses 20 in the axial direction at the same height as the friction elements 17a, 17b. The centrifugal-force pendulum device 14 is disposed with its pendulum masses 20 radially outside of the friction elements 17a, 17b. In addition, the damper springs 18 are arranged at the same radial height as the centrifugal-force pendulum device 14/pendulum masses 20. The centrifugal-force pendulum device 14 is arranged in the axial direction next to the damper springs 18/dual-mass flywheel. As can also be seen, a cover region 38 is realized on the primary wheel 11 by a separate cover element, which cover element covers the centrifugal-force pendulum device 14 on its radial outer side. The fastening unit 4 is in turn offset inward in the radial direction relative to the damper element 18 and to the centrifugal-force pendulum device 14. The fastening unit 4 is disposed in the axial direction next to the friction elements 17a, 17b.

In other words, the bracing solution according to the disclosure enables the systems 2 and 3 to be connected in a space-optimized manner. In addition, the bracing solution provides greater flexibility with regard to the interchangeability of the systems. By installing the disconnect clutch 3 on the intermediate shaft 12, the actuating force can be internally supported. The centrifugal-force pendulum device 14 can be provided on the outside and connected to the disconnect clutch 3. During operation, the engine torque is transmitted to the clutch 3 via the bow spring (damper springs 18) through the drive plate (driver disc 10) and what is termed the bracing solution (fastening unit 4). The torque transmission in the bracing solution 4 is realized via a positive "toothing". The bracing metal sheet (toothed metal sheet 34) is riveted to the counter plate (carrier 16) of the clutch 3.

The clutch 3 can be designed as a multi-plate clutch or a single-disc clutch. Optionally, the centrifugal-force pendulum device 14 can also be attached. In this case, the centrifugal-force pendulum device 14 is arranged radially outside the clutch 3. The actuating force through the clutch 3 is to be reduced by means of a lever transmission. By installing the disconnect clutch 3 on the intermediate shaft 12, the actuating force can be internally supported. Hybrid systems in which clutches 3 are used in conjunction with dampers 2 and centrifugal-force pendulum devices 14 are advantageous areas of application.

REFERENCE NUMERALS

1 Clutch device
2 Torsional vibration damper
3 Disconnect clutch
4 Fastening unit
5a First clutch component 5b Second clutch component
6 First toothing region
7 Output side
8 Second toothing region
9 Clamping element
10 Driver disc
11 Primary wheel
12 Intermediate shaft
13 Actuating unit
14 Centrifugal-force pendulum device
15 Outer side
16 Carrier
17a First friction element
17b Second friction element
18 Damper spring
19 Carrier element
20 Pendulum mass
71 Preloading spring
77 Rivet
23 Locking tongue
24 Axis of rotation
25 Receiving region
26 Connecting flange
27 Support bearing
28 Housing
29 Lever element
30 Stop
31 Through-hole
32 Tooth
33 Bracing collar
34 Toothed metal sheet
35 Fastening region
36 Recess
37 Anchoring region
38 Cover region

The invention claimed is:

1. A clutch device for a drive train of a motor vehicle, comprising:
a torsional vibration damper comprising an output side;
a disconnect clutch comprising a clutch component;
a fastening unit releasably connecting the disconnect clutch to the torsional vibration damper, the fastening unit comprising:
a first toothing region fixed on the clutch component;
a second toothing region fixed on the output side and positively rotationally connected with the first toothing region; and
a clamping element arranged to preload the first toothing region relative to the second toothing region in a circumferential direction with a preloading force; and
a centrifugal-force pendulum device fastened to the clutch component, wherein:
the clutch component comprises a cup-shaped carrier; and
the centrifugal-force pendulum device is fastened to a radial outer side of the cup-shaped carrier.

2. The clutch device of claim 1, wherein:
the torsional vibration damper is designed as a dual-mass flywheel comprising a primary wheel; and
the output side is a driver disc rotatable relative to the primary wheel to damp a torsional vibration.

3. The clutch device of claim 1, wherein:
the clutch component is a first clutch component arranged to receive the first toothing region; and
the disconnect clutch further comprises a second clutch component arranged to be coupled to the first clutch component.

4. The clutch device of claim 3, wherein:
the second clutch component is arranged to be connected for conjoint rotation with an intermediate shaft; and
the first clutch component is arranged to be rotatably mounted on the intermediate shaft.

5. The clutch device of claim 4 wherein the first clutch component and the second clutch component are arranged on the intermediate shaft such that an actuating force applied by an actuating unit to close or open the disconnect clutch is supported via the intermediate shaft.

6. The clutch device of claim 1 wherein the disconnect clutch is designed as a single-disc clutch or a multiple-disc clutch.

7. The clutch device of claim 1 wherein:
the torsional vibration damper comprises a plurality of damper springs; and
the centrifugal-force pendulum device is arranged axially next to the plurality of damper springs; or
the clamping element is arranged radially within the centrifugal-force pendulum device and the plurality of damper springs.

8. A clutch device for a drive train of a motor vehicle, comprising:
a torsional vibration damper comprising an output side;
a disconnect clutch comprising a clutch component;
a fastening unit releasably connecting the disconnect clutch to the torsional vibration damper, the fastening unit comprising:
a first toothing region fixed on the clutch component;
a second toothing region fixed on the output side and positively rotationally connected with the first toothing region; and
a clamping element arranged to preload the first toothing region relative to the second toothing region in a circumferential direction with a preloading force; and
a centrifugal-force pendulum device fastened to the clutch component, wherein:
the disconnect clutch comprises a plurality of friction elements; and
the centrifugal-force pendulum device is arranged at least partially in an axial direction at a same height as the plurality of friction elements.

9. A clutch device for a drive train of a motor vehicle, comprising:
a disconnect clutch comprising a clutch component, the clutch component comprising a first toothing region;
a torsional vibration damper comprising a driver disc on an output side, the driver disc comprising a second toothing region and a recess, the second toothing region being positively rotationally connected with the first toothing region; and
a clamping element comprising:
bracing collars disposed circumferentially between pairs of teeth of the second toothing region and positively rotationally connected with the first toothing region; and
a locking tongue extending in a circumferential direction and pivotable in an axial direction; and
a preload spring, wherein:
in a preloaded state, prior to and during installation of the torsional vibration damper to the disconnect clutch, a distal end of the locking tongue is axially displaced and disposed in the recess to block rotation of the clamping element relative to the driver disc, the distal end being held against an edge of the recess by a circumferential force from the preload spring; and after the torsional vibration damper is installed to the disconnect clutch, a rotation force applied to the driver disc is arranged to further compress the preload spring and rotate the driver disc relative to the clamping element to create a circumferential gap between the recess and the locking tongue, allowing the locking tongue to axially pivot out of the recess; and after the torsional vibration damper is installed to the disconnect clutch and the rotation force applied to the driver disc is removed, the preload spring urges the second toothing region and the bracing collars in opposite circumferential directions against the first toothing region to form a positive toothing engagement that is free of play.

10. The clutch device of claim 9, wherein:
the torsional vibration damper is designed as a dual-mass flywheel comprising a primary wheel; and
the driver disc rotatable relative to the primary wheel to damp a torsional vibration.

11. The clutch device of claim 9, wherein:
the clutch component is a first clutch component arranged to receive the first toothing region; and
the disconnect clutch further comprises a second clutch component arranged to be coupled to the first clutch component.

12. The clutch device of claim 11, wherein:
the second clutch component is arranged to be connected for conjoint rotation with an intermediate shaft; and
the first clutch component is arranged to be rotatably mounted on the intermediate shaft.

13. The clutch device of claim 12 wherein the first clutch component and the second clutch component are arranged on the intermediate shaft such that an actuating force applied by an actuating unit to close or open the disconnect clutch is supported via the intermediate shaft.

14. The clutch device of claim 9 wherein the disconnect clutch is designed as a single-disc clutch or a multiple-disc clutch.

15. The clutch device of claim 9 further comprising a centrifugal-force pendulum device fastened to the clutch component.

16. The clutch device of claim 15 wherein:
the clutch component comprises a cup-shaped carrier; and
the centrifugal-force pendulum device is fastened to a radial outer side of the cup-shaped carrier.

17. The clutch device of claim 15 wherein:
the disconnect clutch comprises a plurality of friction elements; and
the centrifugal-force pendulum device is arranged at least partially in the axial direction at a same height as the plurality of friction elements.

18. The clutch device of claim 15 wherein:
the torsional vibration damper comprises a plurality of damper springs; and
the centrifugal-force pendulum device is arranged axially next to the plurality of damper springs; or
the clamping element is arranged radially within the centrifugal-force pendulum device and the plurality of damper springs.

* * * * *